United States Patent [19]

Itaya et al.

[11] 3,857,858

[45] Dec. 31, 1974

[54] CYCLOPROPANE CARBOXYLIC ACID ESTERS

[75] Inventors: Nobushige Itaya, Minoo; Toshio Mizutani, Hirakata; Shigeyoshi Kitamura; Yositosi Okuno, both of Toyonaka; Keimei Fujimoto, Kobe, all of Japan

[73] Assignee: Sumitomo Chemical Company, Ltd., Osaka, Japan

[22] Filed: Apr. 1, 1970

[21] Appl. No.: 24,858

[30] Foreign Application Priority Data

| | | |
|---|---|---|
| Apr. 8, 1969 | Japan | 44-27529 |
| Apr. 9, 1969 | Japan | 44-27498 |
| Apr. 9, 1969 | Japan | 44-27499 |
| May 27, 1969 | Japan | 44-41505 |
| June 3, 1969 | Japan | 44-43896 |
| June 13, 1969 | Japan | 44-47003 |

[52] U.S. Cl. ... 260/332.2 R, 260/347.4, 260/468 P, 424/275, 424/285, 424/306
[51] Int. Cl. ........................ C07d 63/12, C07d 5/16
[58] Field of Search ....... 260/332.2 R, 347.4, 468 P

[56] References Cited
UNITED STATES PATENTS

| | | | |
|---|---|---|---|
| 3,285,950 | 11/1966 | Weber | 260/468 |
| 3,465,007 | 9/1969 | Elliott | 260/347.4 |
| 3,509,180 | 4/1970 | Elliott | 260/347.4 |
| 3,515,730 | 6/1970 | Matsui et al. | 260/332.2 |
| 3,519,649 | 7/1970 | Ueda et al. | 260/332.2 |
| 3,567,740 | 3/1971 | Matsui et al. | 260/347.4 |
| 3,663,591 | 5/1972 | Osbond et al. | 260/468 P |
| 3,666,789 | 5/1972 | Itaya et al. | 260/468 |
| 3,669,989 | 6/1972 | Itaya et al. | 260/332.2 R |
| 3,673,215 | 6/1972 | Vollrath et al. | 260/332.2 |
| 3,683,005 | 8/1972 | Sota et al. | 260/468 |

FOREIGN PATENTS OR APPLICATIONS 1,133,554  11/1968  Great Britain .................. 260/347.4

Primary Examiner—Henry R. Jiles
Assistant Examiner—C. M. S. Jaisle
Attorney, Agent, or Firm—Stevens, Davis, Miller & Mosher

[57] ABSTRACT

Novel carboxylic acid esters represented by the formula,

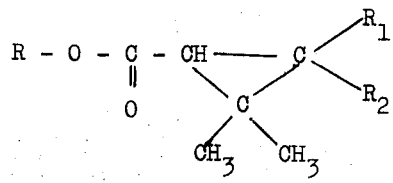

wherein $R_1$ represents hydrogen atom or methyl group; $R_2$ represents methyl, 2-methyl-1-propenyl or 2-methoxy-carbonyl-1-propenyl group when $R_1$ is hydrogen atom, and $R_2$ represents methyl group when $R_1$ is methyl group; and R represents

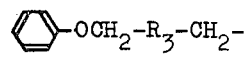

(wherein $R_3$ is a phenylene group, a thiophene residue or a furan residue),

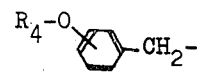

(wherein $R_4$ is an allyl or propargyl group) or $R_5-CH_2-C \equiv C-(CH_2)_n-$ (wherein $R_5$ is a phenyl, chlorophenyl, tolyl, thienyl, furyl or ethynyl group, and n is an integer of 1 or 2), which may be useful for the production of insecticides having excellent insecticidal activity and low toxicity to mammals.

6 Claims, No Drawings

CYCLOPROPANE CARBOXYLIC ACID ESTERS

This invention relates to novel carboxylic acid esters, a process for the preparation therof and insecticidal compositions containing said esters.

More particularly, the invention pertains to novel carboxylic acid esters represented by the formula,

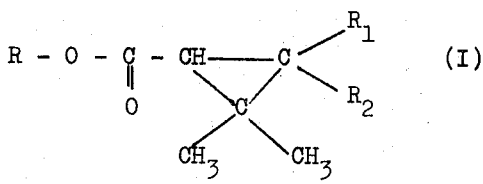

wherein $R_1$ represents hydrogen atom or methyl group; $R_2$ represents methyl, 2-methyl-1-propenyl or 2-methoxy-carbonyl-1-propenyl group when $R_1$ is hydrogen atom, and $R_2$ represents methyl group when $R_1$ is methyl group, and R represents

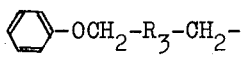

(wherein $R_3$ represents a phenylene group, a thiophene residue or a furan residue),

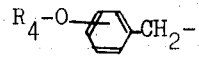

(wherein $R_4$ represents allyl or propargyl group) or $R_5$—$CH_2$—$C \equiv C$—$(CH_2)_n$— (wherein $R_5$ represents a phenyl, chlorophenyl, tolyl, thienyl, furyl or ethynyl group, and n represents an integer of 1 or 2), to a process for producing said esters and to insecticidal compositions containing said esters.

An object of the present invention is to provide novel carboxylic acid esters excellent in insecticidal activity.

Another object is to provide a process for preparing novel carboxylic acid esters excellent in insecticidal activity.

A further object is to provide insecticidal compositions containing novel carboxylic acid esters as active ingredients.

A still further object is to provide at low costs, as insecticides for environment sanitation and for agriculture and horticulature, strong insecticidal compositions which contain novel carboxylic acid esters as active ingredients and which are harmless to mammals.

A feature of the present invention is to obtain the carboxylic acid esters of the formula (I) by reacting, if necessary in the presence of a suitable reaction adjuvant, an alcohol, a halide or a tosylate represented by the formula,

R.A (II)

wherein R is as defined previously, and A represents a hydroxyl group, a halogen atom or tosyloxy group, with a cyclopropanecarboxylic acid, or a reactive derivative thereof, represented by the formula,

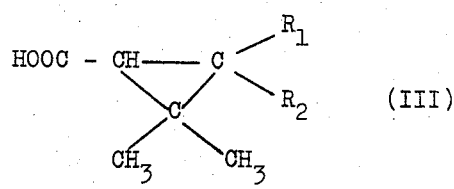

wherein $R_1$ and $R_2$ are as defined previously.

In the compound of the formula (II), the substituent A is selected, within the scope of the present invention so as to be suitable for the object of the invention, according to the form of the other reactant, i.e. the cyclopropanecarboxylic acid of the formula (III) or a reactive derivative thereof. The reactive derivative of cyclopropanecarboxylic acid referred to herein indicates a halide, anhydride, lower alkyl ester or salt of said acid.

The method for the production of the carboxylic acid esters (I) of the present invention are mentioned in further detail below.

The first embodiment of the invention is a process concerned with the case where A in the formula (II) is hydroxyl group, i.e. a process for preparing the carboxylic acid esters of the formula (I) by reacting an alcohol represented by the formula,

wherein R is as defined previously, with the cyclopropanecarboxylic acid of the formula (III) or a halide, anhydride or lower alkyl ester of said acid. When the acid itself is used, the reaction is accomplished under dehydration conditions. That is, the carboxylic acid ester of the formula (I) can be obtained by reacting the cyclopropanecarboxylic acid of the formula (III) with the alcohol of the formula (IV) at an elevated temperature in the presence of an acid catalyst such as a mineral acid of p-toluenesulfonic acid in an azeotropic solvent such as benzene or toluene. Alternatively, the object can be well accomplished by reacting the alcohol with the cyclopropanecarboxylic acid at or above room temperature in an inert solvent such as benzene or petroleum ether in the presence of a dehydrating agent such as dicyclohexylcarbodiimide. When an acid halide is used, the object can be sufficiently accomplished at room temperature by reacting the acid halide with the alcohol of the formula (IV) using as a de-hydrogenhalide agent, an organic tertiary base such as pyridine or triethylamine. In this case, the acid halide used may be any of those within the scope of the present invention. Ordinarily, however, acid chloride is used. In the reaction, the presence of a solvent is preferable for smooth progress of the reaction, and an inert solvent such as benzene, toluene or petroleum benzine is commonly used. When an acid anhydride is used, no reaction adjuvant is particularly required, and the object can be accomplished by reacting the acid anhydride with the alcohol of the formula (IV). In this case, the application of heat and the use of inert solvent are preferable for smooth progress of the reaction but are not indispensable. When a lower alkyl ester is used, the reaction is carried out at an elevated temperature in the presence of a basic catalyst such as sodium alkoxide or the like, and the use of an inert solvent such as benzene or toluene is preferable for proceeding the reaction smoothly. The lower alkyl ester used in this case is preferably methyl ester, ethyl ester, n-propyl ester, isopropyl ester or n-butyl ester.

The second embodiment of the present invention is a process concerned with the case where A in the formula (II) represents a halogen atom, i.e. a process for preparing the carboxylic acid esters of the formula (I) by use of a halide represented by the formula,

R.X    (V)

wherein R is as defined previously, and X represents a halogen atom. In this case, the other reactant, i.e. the cyclopropanecarboxylic acid of the formula (III), may be used in the form of an alkali metal salt or a salt of an organic tertiary base. Alternatively, a base capable of forming said salt may be added, at the time of reaction, together with the carboxylic acid. In this process, it is desirable for practice of the reaction that an inert solvent such as benzene or acetone is used and the system is heated at or below the boiling point of said solvent. The halogen atom represented by X in the formula (V) is chlorine or bromine atom, in general, but may be any other halogen atom.

The third embodiment of the present invention is a process concerned with the case where A in the formula (II) represents a tosyloxy group, i.e. a process for preparing the esters of the formula (I) by use of a tosylate represented by the formula,

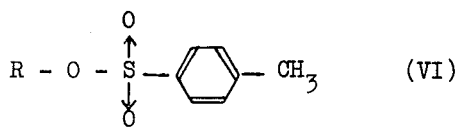
(VI)

wherein R is as defined previously. In this case, the form of the other reactant and the reaction conditions are the same in the case of the second embodiment of the present invention.

All the cyclopropanecarboxylic acids represented by the formula (III) which are used in the present invention can be easily obtained according to known processes. If necessary, these acids can be converted according to known processes into their reactive derivatives. Further, the alcohols represented by the formula (IV) can be easily obtained by reducing corresponding carboxylic acid esters or aldehydes. However, in case R in the formula (IV) is $R_5-CH_2-C \equiv C-(CH_2)_n-$ (wherein $R_5$ and $n$ are as defined previously), the alcohols are obtained by reacting, according to a known process, e.g. the process disclosed in Georges Dupont et al.: Bull. Soc. Chim. France, 1954 816, a Grignard reagent having the group represented by $R_5$ or an alkali metal compound thereof with a 4-halo-2butyne-1-ol, or by reacting, according to the process disclosed in D. Van der Steen et al.: Rec. Trav. Chim. 82 1015 (1963), a halomethyl derivative of $R_5$ with a Grignard reagent of propargyl alcohol or 3-butyne-1-ol. The halides of the formula (V) and the tosylates of the formula (VI) are easily obtained by reacting the alcohols of the formula (IV) with a halogenating agent or p-toluenesulfonyl chloride.

Among the cyclopropanecarboxylic acids represented by the formula (III), there includes optical isomers derived from asymmetric carbon atoms, for example, the (+)-trans-chrysanthemic acid is included therein.

All the carboxylic acid esters provided in accordance with the present invention are novel compounds unknown to the literature and, as the result of tests, they showed prominent effects for the control of not only such sanitary injurious insects as houseflies, mosquitoes, cockroaches, etc., but also common agricultural and forestry injurious insects.

Among the compounds represented by the aforesaid formula (I), those particularly useful for the objects of the present invention are as set forth below, but it is needless to say that compounds usable in the present invention are not limited only to these.

Compound No.    Structure (1)
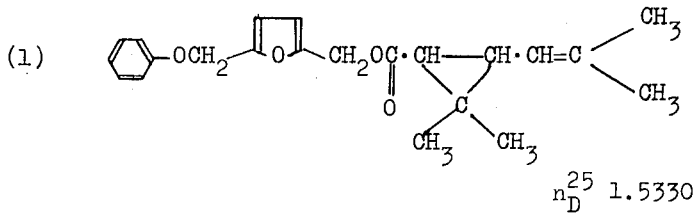

$n_D^{25}$ 1.5330

5-Phenoxymethylfurfuryl chrysanthemate (2)
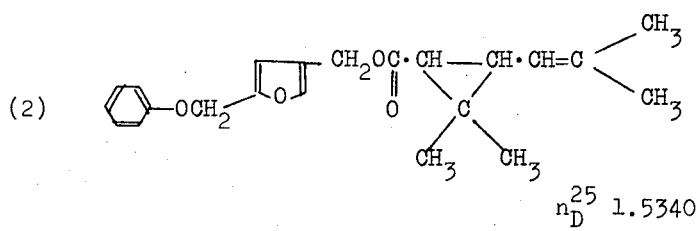

$n_D^{25}$ 1.5340

5-Phenoxymethyl-3-furylmethyl chrysanthemate (3) 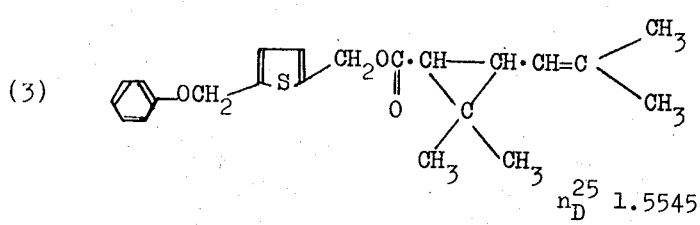
$n_D^{25}$ 1.5545
5-Phenoxymethyl-2-thenyl chrysanthemate
(4) 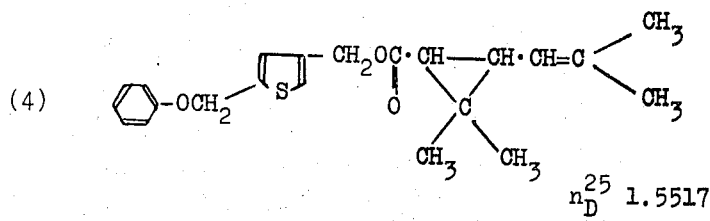
$n_D^{25}$ 1.5517
5-Phenoxymethyl-3-thenyl chrysanthemate
(5) 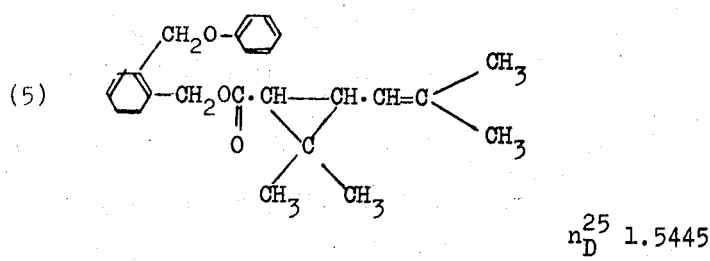
$n_D^{25}$ 1.5445
2-Phenoxymethylbenzyl chrysanthemate
(6) 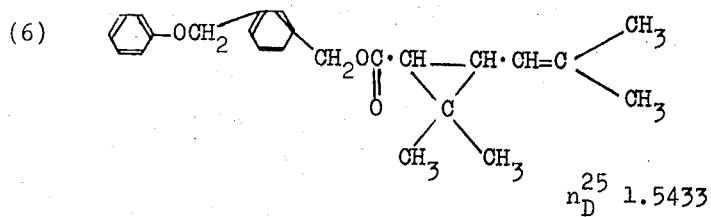
$n_D^{25}$ 1.5433
3-Phenoxymethylbenzyl chrysanthemate
(7) 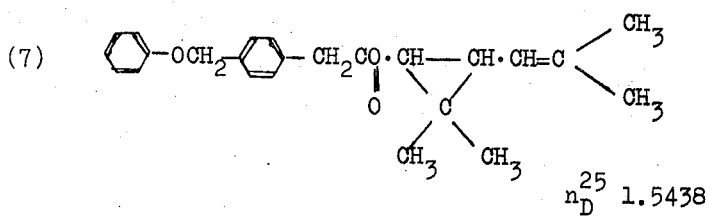
$n_D^{25}$ 1.5438
4-Phenoxymethylbenzyl chrysanthemate (8) 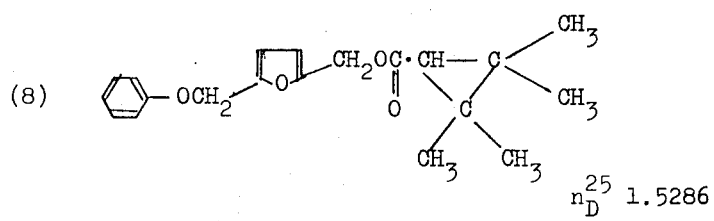
$n_D^{25}$ 1.5286
5'-Phenoxymethylfurfuryl 2,2,3,3-tetramethyl-cyclopropane carboxylate
(9) 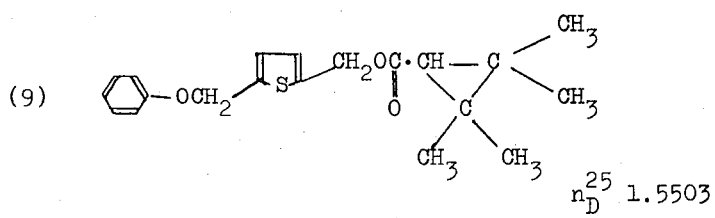
$n_D^{25}$ 1.5503
5'-Phenoxymethyl-2'-thenyl 2,2,3,3-tetramethylcyclopropanecarboxylate
(10) 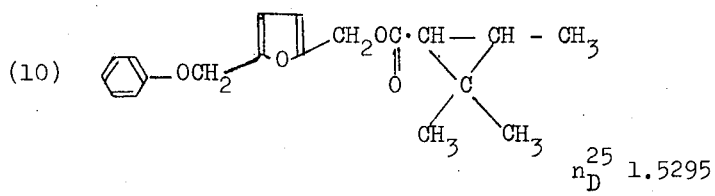
$n_D^{25}$ 1.5295
5'-Phenoxymethylfurfuryl 2,2,3-trimethylcyclopropanecarboxylate
(11) 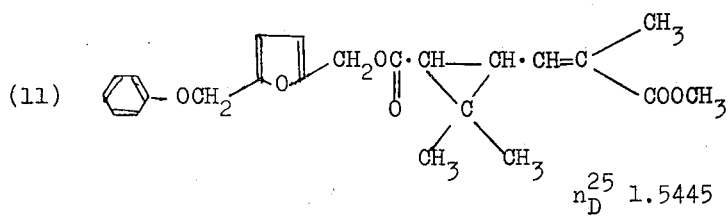
$n_D^{25}$ 1.5445
5-Phenoxymethylfurfuryl pyrethrate
(12) 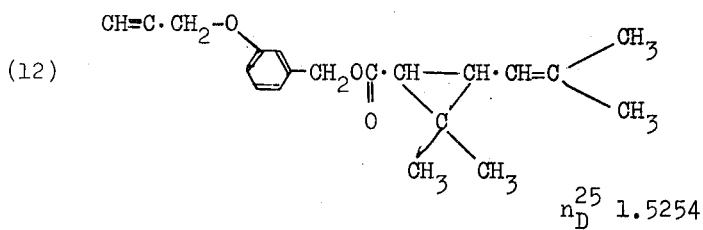
$n_D^{25}$ 1.5254
3-Propargyloxybenzyl chrysanthemate

(13) 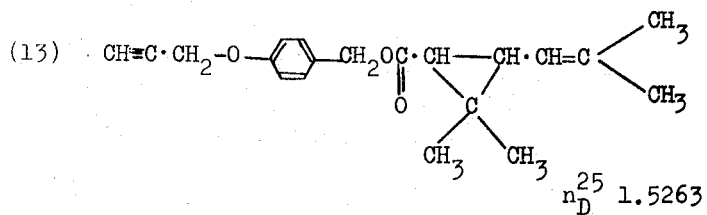
$n_D^{25}$ 1.5263
4-Propargyloxybenzyl chrysanthemate
(14) 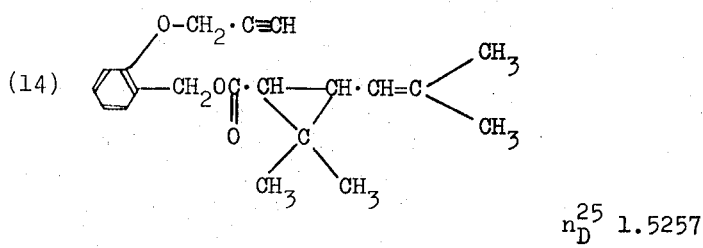
$n_D^{25}$ 1.5257
2-Propargyloxybenzyl chrysanthemate
(15) 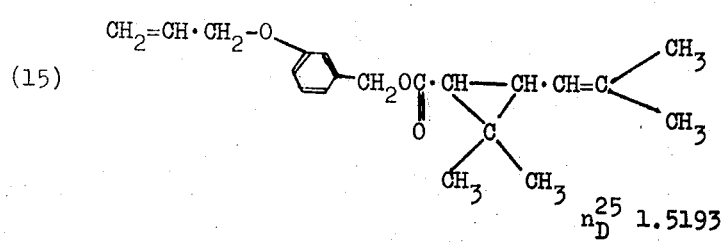
$n_D^{25}$ 1.5193
3-Allyloxybenzyl chrysanthemate
(16) 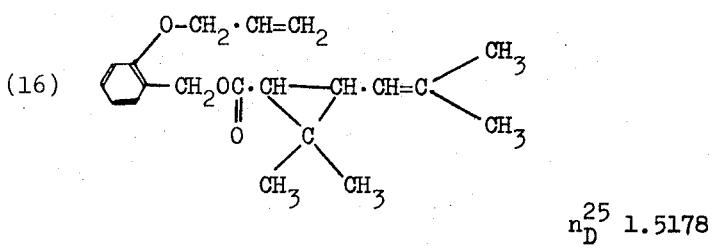
$n_D^{25}$ 1.5178
2-Allyloxybenzyl chrysanthemate
(17) 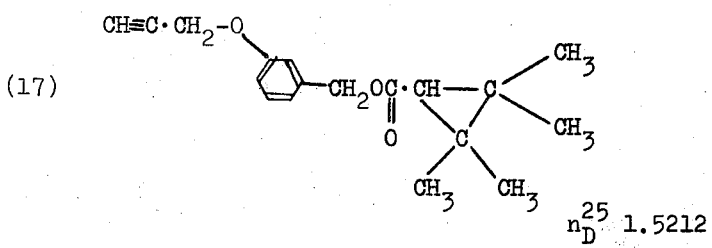
$n_D^{25}$ 1.5212
3'-Propargyloxybenzyl-2,2,3,3-tetramethylcyclopropanecarboxylate

(18) 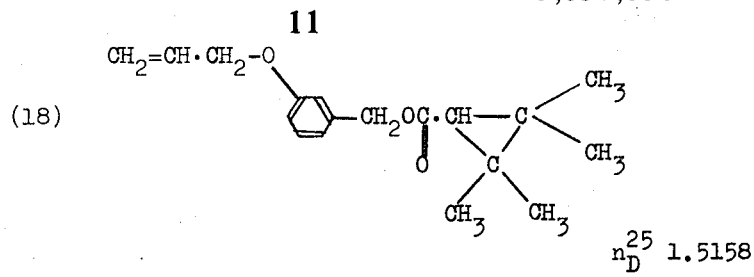
3'-Allyloxybenzyl-2,2,3,3-tetramethylcyclopropanecarboxylate
(19) 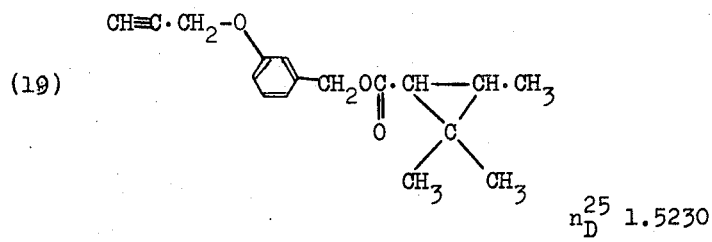
3'-Propargyloxybenzyl-2,2,3-trimethylcyclopropanecarboxylate
(20) 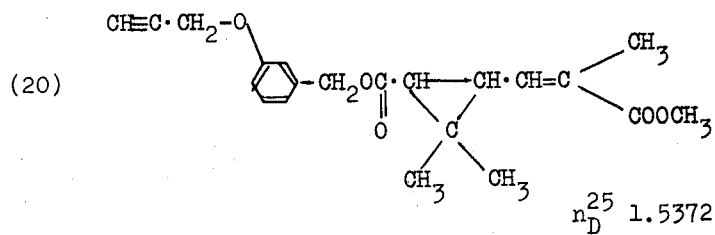
3-Propargyloxybenzyl pyrethrate
(21) 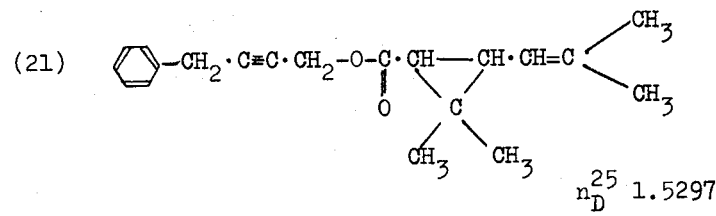
Benzylpropargyl chrysanthemate
(22) 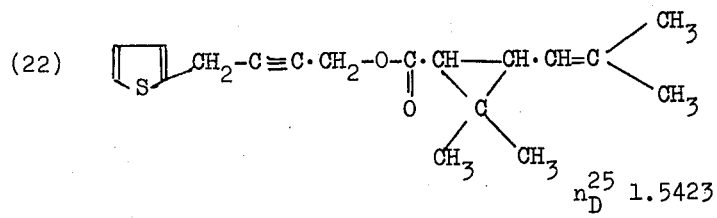
Thenylpropargyl chrysanthemate

(23) 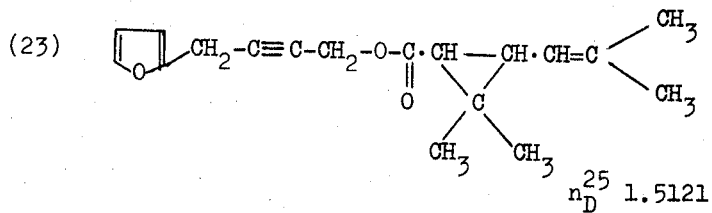
Furfurylpropargyl chrysanthemate
(24) 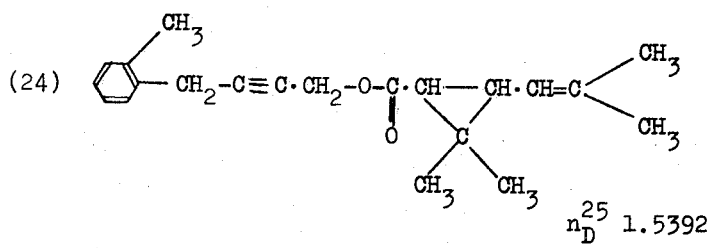
o-Methylbenzylpropargyl chrysanthemate
(25) 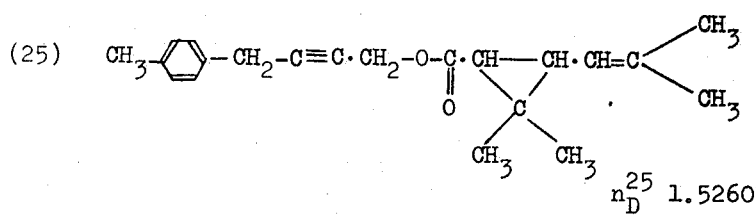
p-Methylbenzylpropargyl chrysanthemate
(26) 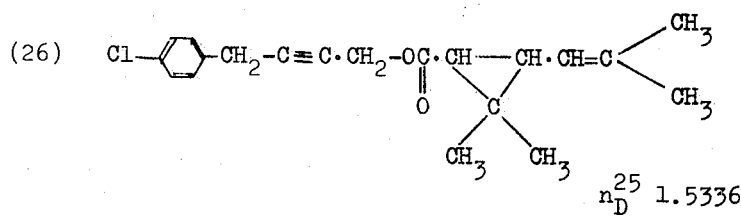
p-Chlorobenzylpropargyl chrysanthemate
(27) 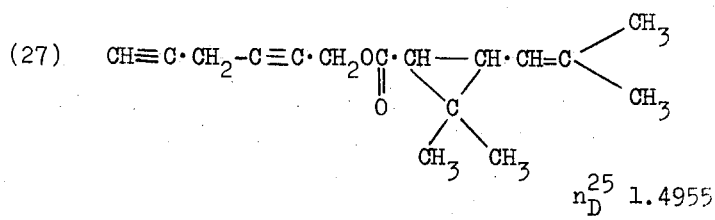
Propargylpropargyl chrysanthemate

(28) 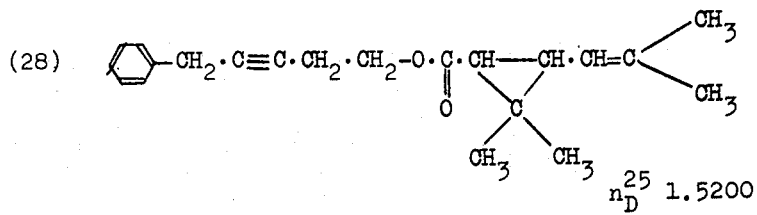
5-Phenyl-3-pentynyl chrysanthemate
(29) 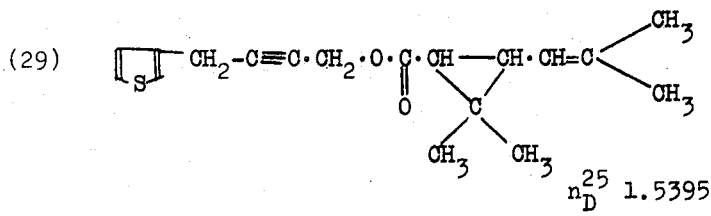
(3-Thenyl)-propargyl chrysanthemate
(30) 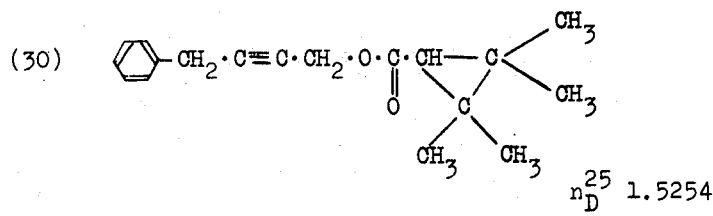
Benzylpropargyl 2,2,3,3-tetramethylcyclopropanecarboxylate
(31) 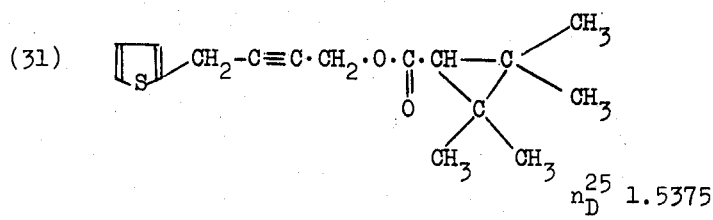
Thenylpropargyl 2,2,3,3-tetramethylcyclopropanecarboxylate
(32) 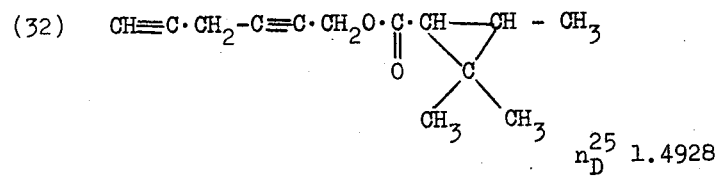
Propargylpropargyl 2,2,3-trimethylcyclopropanecarboxylate
(33) 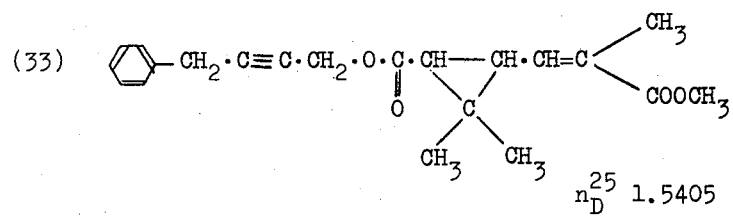
Benzylpropargyl pyrethrate The process of the present invention is illustrated in further detail below with examples, but it is needless to say that the invention is not limited only to these examples.

In the first place, standard operational procedures are set forth below.

A. Procedure according to the reaction of alcohol with carboxylic acid halide:

0.05 mole of alcohol is dissolved in 3 times the volume of said alcohol of dry benzene, and 0.07 mole of pyridine is added to the solution. On the other hand, 0.053 mole of carboxylic acid chloride is dissolved in 3 times the volume of said chloride of dry benzene. This solution is mixed with the previously prepared solution, whereby an exothermic reaction takes place. After allowing to stand overnight in a tightly closed vessel, the mixed solution is charged with a small amount of water to dissolve deposited pyridine hydrochloride, and the aqueous layer is separated. The organic layer is washed successively with a 5% hydrochloric acid solution, a saturated sodium carbonate solution and a saturated sodium chloride solution, and then dried over anhydrous magnesium sulfate. Thereafter, the benzene is removed by distillation, and the residue is purified according to silica gel chromatography to obtain the desired product in the form of pale yellow oil.

B. Procedure according to the dehydration reaction of alcohol with carboxylic acid:

A mixture comprising 0.05 mole of alcohol and 0.05 mole of carboxylic acid is dissolved in 3 times the volume of said mixture of benzene. To this solution is added 0.08 mole of dicyclohexyl-carbodiimide, and the solution is allowed to stand overnight in a tightly closed vessel. On the next day, the solution is refluxed for 2 hours to complete the reaction, and then the reaction mixture is subjected to the same treatment as in the standard operational procedure A to obtain the desired product.

C. Procedure according to the reaction of alcohol with carboxylic acid anhydride:

0.05 mole of alcohol is dissolved in 3 times the volume of said alcohol of toluene. To this solution is added 0.06 mole of carboxylic acid anhydride (synthesized from carboxylic acid and acetic anhydride). The resulting mixture is reacted at 100°C. for 3 hours, and then cooled. At below 10°C., the reaction mixture is neutralized by addition of a 10% aqueous sodium hydroxide solution to recover as sodium salts excess acid anhydride and carboxylic acid formed during the reaction. Subsequently, the organic layer is subjected to the same treatment as in the standard operational procedure A to obtain the desired ester.

D. Procedure according to the ester exchange reaction of alcohol with lower alkyl ester of carboxylic acid:

A mixture comprising 0.05 mole of alcohol and 0.06 mole of ethyl ester of carboxylic acid is dissolved in 5 times the volume of said mixture of dry toluene. To this solution are added 0.005 mole of sodium ethoxide and the resulting mixture is refluxed with thorough stirring for 10 hours to terminate the reaction. The reaction liquid is charged with cold water and then separated. Thereafter, the same treatment as in the standard operational procedure A is effected to obtain the desired product.

E. Procedure according to the reaction of halide with carboxylic acid:

A mixture comprising 0.05 mole of halide and 0.06 mole of carboxylic acid is dissolved in 3 times the volume of said mixture of acetone, and the solution is maintained at 15 – 20°C. Into this solution is gradually dropped with stirring a solution of 0.08 mole of triethylamine dissolved in acetone of 3 times the volume of said triethylamine. After completion of the dropping, the mixed solution is refluxed for 2 hours to complete the reaction. After cooling the reaction mixture, precipitated triethylamine hydrochloride is separated by filtration, and the acetone is removed by distillation from the filtrate. The residue is dissolved in 3 times the volume of said residue of benzene and then subjected to the same treatment as in the standard operational procedure A to obtain the desired ester.

F. Procedure according to the reaction of tosylate of alcohol with carboxylic acid salt:

0.05 mole of tosylate is dissolved in acetone of 3 times the volume of the tosylate. To this solution is added with thorough stirring at room temperature over a period of 30 minutes 0.06 mole of sodium carboxylate (synthesized by reacting carboxylic acid in water with an equimolar amount of sodium hydroxide and removing the water by distillation, followed by drying). After the addition, the mixture is refluxed for 30 minutes to complete the reaction. After cooling the reaction mixture, precipitates are separated by filtration, and the acetone is removed by distillation from the filtrate. The residue is dissolved in benzene of 3 times the volume of the residue, and the solution is subjected to the same treatment as in the standard operational procedure A to obtain the desired product.

The results of practice of the present process, carried out according to the aforesaid standard operational procedures, are set forth in the tables below, but these do not limit the scope of the present invention.

| Example No. | Alcohol or derivative thereof | Acid or derivative thereof | Reaction procedure | Name of compound | Yield (%) | Refractive index ($n_D^{25}$) | Elementary analysis | | | |
|---|---|---|---|---|---|---|---|---|---|---|
| | | | | | | | | C | H | S | Cl (%) |
| 1 | 5-Phenoxymethyl-furfuryl alcohol | (±)-Cis,trans-chrysanthemic acid chloride | A | 5-Phenoxymethylfurfuryl chrysanthemate | 89 | 1.5330 | Found 74.4 7.5 - -<br>Cal'd 74.6 7.4 - -<br>(for $C_{22}H_{26}O_4$) | | | | |
| 2 | 5-Phenoxymethyl-3-furylmethyl alcohol | (±)-Cis,trans-chrysanthemic acid chloride | A | 3-Phenoxymethyl-3-furyl-methyl chrysanthemate | 90 | 1.5340 | Found 74.6 7.5 - -<br>Cal'd 74.6 7.4 - -<br>(for $C_{22}H_{26}O_4$) | | | | |
| 3 | 5-Phenoxymethyl-2-thenyl tosylate | Sodium (±)-cis,trans-chrysanthemate | F | 5-Phenyoxymethyl-2-thenyl chrysanthemate | 83 | 1.5545 | Found 71.0 7.4 8.6 -<br>Cal'd 71.3 7.1 8.7 -<br>(for $C_{22}H_{26}O_3S$) | | | | |
| 4 | 5-Phenoxymethyl-thenyl alcohol | (±)-Cis,trans-chrysanthemic acid chloride | A | 5-Phenoxymethyl-3-thenyl chrysanthemate | 90 | 1.5517 | Found 70.8 7.4 8.4 -<br>Cal'd 71.3 7.1 8.7 -<br>(for $C_{22}H_{26}O_3S$) | | | | |
| 5 | 2-Phenoxymethyl-benzyl alcohol | (±)-Cis,trans-chrysanthemic acid chloride | A | 2-Phenoxymethylbenzyl chrysanthemate | 87 | 1.5445 | Found 79.3 7.8 - -<br>Cal'd 79.1 7.7 - -<br>(for $C_{24}H_{28}O_3$) | | | | |
| 6 | 3-Phenoxymethyl-benzyl alcohol | Ethyl (±)-cis,trans-chrysanthemate | D | 3-Phenoxymethylbenzyl chrysanthemate | 80 | 1.5433 | Found 79.1 7.7 - -<br>Cal'd 79.1 7.7 - -<br>(for $C_{24}H_{28}O_3$) | | | | |
| 7 | 4-Phenoxymethyl-benzyl chloride | (±)-Cis,trans-chrysanthemic acid | E | 4-Phenoxymethylbenzyl chrysanthemate | 87 | 1.5438 | Found 79.1 7.8 - -<br>Cal'd 79.1 7.7 - -<br>(for $C_{24}H_{28}O_3$) | | | | |
| 8 | 5-Phenoxymethyl furfuryl alcohol | 2,2,3,3-Tetramethyl-cyclopropane-carboxylic acid chloride | A | 5'-Phenoxymethylfurfuryl-2,2,3,3-tetramethyl-cyclopropanecarboxylate | 91 | 1.5286 | Found 72.9 7.5 - -<br>Cal'd 73.1 7.4 - -<br>(for $C_{20}H_{24}O_4$) | | | | |
| 9 | 5-Phenoxymethyl-2-thenyl alcohol | 2,2,3,3-Tetramethyl-cyclopropane-carboxylic acid anhydride | C | 5'-Phenoxymethyl-2'-thenyl-2,2,3,3-tetramethylcyclopropane-carboxylate | 91 | 1.5503 | Found 69.6 7.0 9.3 -<br>Cal'd 69.7 7.0 9.3 -<br>(for $C_{20}H_{24}O_3S$) | | | | |
| 10 | 5-Phenoxymethyl-furfuryl alcohol | 2,2,3-Trimethyl-cyclopropane-carboxylic acid chloride | A | 5'-Phenoxymethylfurfuryl-2,2,3-trimethyl-cyclopropanecarboxylate | 87 | 1.5295 | Found 72.8 9.4 - -<br>Cal'd 72.6 7.1 - -<br>(for $C_{19}H_{22}O_4$) | | | | |
| 11 | 5-Phenoxymethyl-furfuryl alcohol | (±)-Trans,trans-pyrethric acid | B | 5-Phenoxymethylfurfuryl pyrethrate | 84 | 1.5445 | Found 69.4 6.5 - -<br>Cal'd 69.3 6.6 - -<br>(for $C_{23}H_{26}O_6$) | | | | |
| 12 | 3-Propargyloxybenzyl alcohol | (±)-Cis,trans-chrysanthemic acid anhydride | C | 3-Propargyloxybenzyl chrysanthemate | 87 | 1.5254 | Found 76.8 7.9 - -<br>Cal'd 76.9 7.7 - -<br>(for $C_{20}H_{24}O_3$) | | | | |
| 13 | 4-Propargyloxybenzyl alcohol | (±)-Cis,trans-chrysanthemic acid chloride | A | 4-Propargyloxybenzyl chrysanthemate | 92 | 1.5263 | Found 77.2 7.9 - -<br>Cal'd 76.9 7.7 - -<br>(for $C_{20}H_{24}O_3$) | | | | |
| 14 | 2-Propargyloxybenzyl tosylate | Sodium (±)-cis,trans-chrysanthemate | E | 2-Propargyloxybenzyl chrysanthemate | 87 | 1.5257 | Found 77.4 8.0 - -<br>Cal'd 76.9 7.7 - -<br>(for $C_{20}H_{24}O_3$) | | | | |
| 15 | 3-Allyloxybenzyl chloride | (±)-Cis,trans-chrysanthemic acid | D | 3-Allyloxybenzyl chrysanthemate | 85 | 1.5193 | Found 76.0 8.3 - -<br>Cal'd 76.4 8.3 - -<br>(for $C_{20}H_{26}O_3$) | | | | |
| 16 | 2-Allyloxybenzyl alcohol | (±)-Cis,trans-chrysanthemic acid chloride | A | 2-Allyloxybenzyl chrysanthemate | 91 | 1.5178 | Found 76.7 8.3 - -<br>Cal'd 76.4 8.3 - -<br>(for $C_{20}H_{26}O_3$) | | | | |
| 17 | 3-Propargyloxybenzyl alcohol | 2,2,3,3-Tetramethyl-cyclopropane-carboxylic acid anhydride | C | 3'-Propargyloxybenzyl-2,2,3,3-tetramethyl-cyclopropanecarboxylate | 88 | 1.5212 | Found 75.6 7.7 - -<br>Cal'd 75.5 7.7 - -<br>(for $C_{18}H_{22}O_3$) | | | | |

| Example No. | Alcohol or derivative thereof | Acid or derivative thereof | Reaction procedure | Cyclopropanecarboxylic acid obtained Name of compound | Yield (%) | Refractive index ($n_D^{25}$) | Elementary analysis C | H | S | Cl (%) |
|---|---|---|---|---|---|---|---|---|---|---|
| 18 | 3-Allyloxybenzyl alcohol | 2,2,3,3-Tetramethyl-cyclopropane-carboxylic acid chloride | A | 3'-Allyloxybenzyl-2,2,3,3-tetramethyl-cyclopropanecarboxylate | 90 | 1.5158 | Found 75.0<br>Cal'd 75.0<br>(for $C_{18}H_{24}O_3$) | 8.5<br>8.4 | –<br>– | –<br>– |
| 19 | 3-Propargyloxybenzyl alcohol | 2,2,3-Trimethyl-cyclopropane-carboxylic acid chloride | A | 3'-Propargyloxybenzyl-2,2,3-trimethyl-cyclopropanecarboxylate | 87 | 1.5230 | Found 75.2<br>Cal'd 75.0<br>(for $C_{17}H_{20}O_3$) | 7.6<br>7.4 | –<br>– | –<br>– |
| 20 | 3-Propargyloxybenzyl alcohol | (±)-Trans,trans-pyrethric acid | B | 3-Propargyloxybenzyl pyrethrate | 85 | 1.5372 | Found 70.8<br>Cal'd 70.8<br>(for $C_{21}H_{24}O_5$) | 7.1<br>6.8 | –<br>– | –<br>– |
| 21 | Benzylpropargyl chloride | (±)-Cis,trans-chrysanthemic acid | D | Benzylpropargyl chrysanthemate | 89 | 1.5297 | Found 80.9<br>Cal'd 81.0<br>(for $C_{20}H_{24}O_2$) | 8.4<br>8.2 | –<br>– | –<br>– |
| 22 | Thenylpropargyl alcohol | (±)-Cis,trans-chrysanthemic acid anhydride | C | Thenylpropargyl chrysanthemate | 87 | 1.5423 | Found 71.3<br>Cal'd 71.5<br>(for $C_{18}H_{22}O_2S$) | 7.5<br>7.3 | 10.6<br>10.6 | –<br>– |
| 23 | Furfurylpropargyl alcohol | (±)-Cis,trans-chrysanthemic acid chloride | A | Furfurylpropargyl chrysanthemate | 90 | 1.5121 | Found 75.2<br>Cal'd 75.5<br>(for $C_{18}H_{22}O_3$) | 7.9<br>7.7 | –<br>– | –<br>– |
| 24 | o-Methylbenzyl-propargyl alcohol | (±)-Cis,trans-chrysanthemic acid chloride | A | o-Methylbenzylpropargyl chrysanthemate | 92 | 1.5392 | Found 81.3<br>Cal'd 81.3<br>(for $C_{21}H_{26}O_2$) | 8.7<br>8.4 | –<br>– | –<br>– |
| 25 | p-Methylpropargyl alcohol | (±)-Cis,trans-chrysanthemic acid chloride | A | p-Methylbenzylpropargyl chrysanthemate | 92 | 1.5260 | Found 81.2<br>Cal'd 81.3<br>(for $C_{21}H_{26}O_2$) | 8.6<br>8.4 | –<br>– | –<br>– |
| 26 | p-Chlorobenzyl propargyl alcohol | (±)-Cis,trans-chrysanthemic acid chloride | A | p-Chlorobenzylpropargyl chrysanthemate | 89 | 1.5336 | Found 72.3<br>Cal'd 72.6<br>(for $C_{20}H_{23}O_2Cl$) | 7.0<br>7.0 | –<br>– | 11.1<br>10.7 |
| 27 | Propargylpropargyl alcohol | (±)-Cis,trans-chrysanthemic acid chloride | A | Propargylpropargyl chrysanthemate | 87 | 1.4955 | Found 78.7<br>Cal'd 78.7<br>(for $C_{16}H_{20}O_2$) | 8.4<br>8.3 | –<br>– | –<br>– |
| 28 | 5-Phenyl-3-pentyne-1-ol | (±)-Cis,trans-chrysanthemic acid chloride | A | 5-Phenyl-3-pentynyl chrysanthemate | 90 | 1.5200 | Found 81.5<br>Cal'd 81.3<br>(for $C_{21}H_{26}O_2$) | 8.5<br>8.4 | –<br>– | –<br>– |
| 29 | 3-Thenyl-propargyl alcohol | (±)-Cis,trans-chrysanthemic acid chloride | A | 3-Thenyl-propargyl chrysanthemate | 90 | 1.5395 | Found 71.1<br>Cal'd 71.5<br>(for $C_{18}H_{22}O_2S$) | 7.6<br>7.3 | 10.2<br>10.6 | –<br>– |
| 30 | Benzylpropargyl tosylate | Sodium 2,2,3,3-tetramethyl-cyclopropane-carboxylate | E | Benzylpropargyl-2,2,3,3-tetramethylcyclopropane-carboxylate | 84 | 1.5254 | Found 80.0<br>Cal'd 80.0<br>(for $C_{18}H_{22}O_2$) | 8.2<br>8.2 | –<br>– | –<br>– |
| 31 | Thenylpropargyl alcohol | 2,2,3,3-Tetramethyl-cyclopropane-carboxylic acid anhydride | C | Thenylpropargyl-2,2,3,3-tetramethylcyclopropane-carboxylate | 89 | 1.5375 | Found 69.4<br>Cal'd 69.5<br>(for $C_{16}H_{20}O_2S$) | 7.6<br>7.3 | 11.4<br>11.6 | –<br>– |
| 32 | Propargylpropargyl alcohol | 2,2,3-Trimethyl-cyclopropane-carboxylic acid chloride | A | Propargylpropargyl-2,2,3-trimethylcyclopropane-carboxylate | 85 | 1.4928 | Found 76.5<br>Cal'd 76.4<br>(for $C_{13}H_{16}O_2$) | 8.0<br>7.9 | –<br>– | –<br>– |
| 33 | Benzylpropargyl alcohol | (±)-Trans,trans-pyrethric acid | B | Benzylpropargyl pyrethrate | 85 | 1.5405 | Found 74.1<br>Cal'd 74.1<br>(for $C_{21}H_{24}O_4$) | 7.2<br>7.1 | –<br>– | –<br>– |

There are no insecticides available at present, which are quick acting, harmless to mammals and usable without anxiety, other than pyrethrum extracts (containing pyrethrin) or synthetic allethrins which are homologues of the active ingredient of said pyrethrum extracts. Despite their usefulness, however, the pyrethrum extracts and the like are liable to be restricted in uses due to their being relatively expensive.

The novel carboxylic acid esters represented by the aforesaid formula (I), which are used as active ingredients of the present insecticidal compositions, can be prepared at low costs, as mentioned previously, and not only show excellent insecticidal activity against houseflies, mosquitoes, cockroaches and the like sanitary injurious insects but also are low in toxicity to mammals.

By virtue of such characteristics as mentioned above, the insecticidal compositions of the present invention have a wide scope of uses particularly for prevention of epidemics. In addition thereto, the compositions show prominent insecticidal activity against insects injurious to stored cereals, agriculture and forestry, and hence are markedly useful also for the control of these injurious insencts.

Further, particularly due to their low toxicity, the compositions are excellent also in that they are freely usable for crops before harvest, home horticulture, green house cultivation and packaging materials for foods.

In formulating insecticidal compositions containing the present compounds as active ingredients, it is sometimes preferable, depending on the forms of the compositions, to use the compounds after dissolving in an organic solvent such as xylene, methylnaphthalene, acetone or trichloroethane. Generally, however, the compounds are formulated, as occasion demands, into any forms of oil sprays, emulsifiable concentrates, wettable powders, dusts, aerosols, mosquito coils, electric heating type fumigants and other fumigants, granules, etc., according to ordinary processes applied to pyrethrum extracts and allethrins, using diluting adjuvants for common insecticides. Further, they may be processed into death-inducing powdery or solid preparations incorporated with baits or other materials attractive for injurious insects. The present insecticides can be increased in insecticidal effects when used in admixture with synergists for pyrethroids such as, for example, 3,-4-methylenedioxy-6-propylbenzyl diethylene glycol ether (hereinafter referred to as "piperonyl butoxide"), 1,2-methylenedioxy-4-[2-(octyl-sulfinyl) propyl] benzene (hereinafter referred to as "sulfoxide"), 4-(3,4-methylenedioxyphenyl)-5-methyl-1,3-dioxane (hereinafter referred to as "surfoxane"), N-(2-ethylhexyl)-bicyclo(2,2,1)-hepta-5-ene-2,3-dicarboximide (hereinafter referred to as "MGK-264"), N-(4-pentynyl)-phthalimide, O-n-propyl-O-proparagylphenyl phosphonate (hereinafter referred to as "NIA-16388"), etc. When the present compounds are formulated into mosquito coils, in particular, the insecticidal effects of the mosquito coils can be increased by addition of such known additives as terephthalic acid, isophthalic acid, BHT, etc.

In addition, the present compounds may be formulated into multi-purpose compositions by incorporation of other physiologically active substances, e.g. cyclopropanecarboxylic acid ester type insecticides such as pyrethrum extracts, allethrins, N-(chrysanthemoxymethyl)-3,4,5,6-tetrahydrophthalimide (hereinafter referred to as "Phthalthrin"), 5-benzyl-3-furylmethyl chrysanthemate (hereinafter referred to as "Chrysron", registered trade name for a product of Sumitomo Chemical Co., Ltd.), etc., organo-chlorine type insecticides such as DDT, BHC, etc., organo-phosphorus type insecticides such as 0,0-dimethyl-0-(3-methyl-4-mitrophenyl) phosphorothioate (hereinafter referred to as "Sumithion", registered trade name for a product of Sumitomo Chemical Co., Ltd.), 0,0-dimethyl-0-(2,2-dichlorovinyl) phosphate (hereinafter referred to as "DDVP"), etc., carbamate type insecticides such as 1-naphthyl-N-methylcarbamate, 3,4-dimethylphenyl-N-methylcarbamate, 3,5-dimethylphenyl-N-methylcarbamate, etc., other insecticides, fungicides, mitecides, herbicides, fertilizers, and other agricultural chemicals.

It is needless to say that the present compounds include optical active esters, for example, (+)-trans-chrysanthemic acid ester.

The preparation and effects of the present compositions are illustrated below with reference to examples and test examples, but the scope of the invention is by no means limited only to these. In the examples, the names of the compounds are represented by the numbers of the compounds exemplifid previously.

Example 34

0.2 part of each of the present compounds (1), (2) and (11) was dissolved in deodorized kerosene to make the total amount 100 parts, whereby oil sprays of the individual compounds were obtained.

Example 35

A mixture comprising 0.2 part of each of the present compounds (3), (4) and (8) and 1 part of piperonyl butoxide was dissolved in deodorized kerosene to make the total amount 100 parts, whereby oil sprays of the individual compounds were obtained.

Example 36

20 parts of each of the present compounds (3), (4), (5), (6), (7) and (9), 10 parts of Sorpol SM-200 (registered trade name for an emulsifier produced by Toho Chemical Co.) and 70 parts of xylene were thoroughly stirred and mixed together to obtain emulsifiable concentrates containing 20 % of the individual compounds.

Example 37

A mixture comprising 1.5 parts of each of the present compounds (1) and (2) and 0.2 part of Chrysron was dissolved in 20 parts of acetone. This solution was thoroughly stirred and mixed in a mortar with 98.3 parts of 300 mesh diatomaceous earth, and then the acetone was removed by vaporization to obtain dusts of the individual compounds.

Example 38

0.3 part of the present compound (8), 0.1 part of phthalthrin, 0.1 part of Chrysron, 7 parts of xylene and 7.5 parts of deodorized kerosene were mixed and dissolved together, and the thus prepared solution was filled in an aerosol container. After attaching a valve portion to the container, 85 parts of a propellant (liquefied petroleum gas) was charged therein under pressure through said valve portion to obtain an aerosol.

Example 39

A solution of 1 g. of each of the present compound (8) and (10) in 20 ml. of methanol was homogeneously stirred and mixed with 99 g. of a mosquito coil carrier (a 3:5:1 mixture of tabu powder, pyrethrum marc and wood flour). After vaporizing the methanol, the mixture was thoroughly kneaded with 150 ml. of water and then shaped and dried to obtain mosquito coils containing 1 % of the individual compounds.

Example 40

0.2 part of each of the present compounds (12), (14) and (20) was dissolved in deodorized kerosene to make the total amount 100 parts, whereby oil sprays of the individual compounds were obtained.

Example 41

A mixture comprising 0.2 part of each of the present compounds (13), (15) and (18) and 1 part of NIA-16388 was dissolved in deodorized kerosene to make the total amount 100 parts, whereby oil sprays of the individual compounds were obtained.

Example 42

A mixture comprising 0.2 part of each of the present compounds (16), (17) and (19) and 1 part of piperonyl butoxide was dissolved in deodorized kerosene to make the total amount 100 parts, whereby oil sprays of the individual compounds were obtained.

Example 43

20 parts of each of the present compounds (12), (13), (14), (15), (16), (17), (18), (19) and (20), 10 parts of Sorpol SM-200 and 70 parts of xylene were throuthly stirred and mixed together to obtain emulsifiable concentrates containing 20% of the present compounds.

Example 44

A solution of 1 g. of each of the present compounds (17) and (18) in 20 ml. of methanol was homogeneously stirred and mixed with 99 g. of a mosquito coil carrier (a 3:5:1 mixture of tabu powder, pyrethrum marc and wood flour). After vaporizing the methanol, the mixture was thoroughly kneaded with 150 ml. of water and then shaped and dried to obtain mosquito coils containing 1 % of the individual compounds.

Example 45

A mixture comprising 1 part of each of the present compounds (12) and (13) and 2 parts of piperonyl butoxide was dissolved in 20 parts of acetone. This solution was thoroughly stirred and mixed in a mortar with 97 parts of 300 mesh diatomaceous earth, and then the acetone was removed by vaporization to obtain dusts of the individual compounds.

Example 46

0.3 part of the present compound (12), 0.1 part of phthalthrin, 2 parts of NIA-16388, 6 parts of xylene and 6.6 parts of deodorized kerosene were mixed and dissolved together, and thus prepared solution was filled in an aerosol container. After attaching a valve portion to the container, 85 parts of a propellant (liquefied petroleum gas) was charged therein under pressure through said valve portion to obtain an aerosol.

Example 47

0.2 part of each of the present compounds (21), (22), (30) and (33) was dissolved in deodorized kerosene to make the total amount 100 parts, whereby oil sprays containing 0.2 % of the individual compounds were obtained.

Example 48

A mixture comprising 0.2 part of each of the present compounds (23), (27) and (31) and 1 part of piperonyl butoxide was dissolved in deodorized kerosene to make the total amount 100 parts, whereby oil sprays of the individual compounds were obtained.

Example 49

20 parts of each of the present compounds (21), (22), (23), (24), (25), (26), (27), (28), (29) and (31), 10 parts of Sorpol SM-200 and 70 parts of xylene were thoroughly stirred and mixed together to obtain emulsifiable concentrates containing 20 % of the present compounds.

Example 50

A solution of 1 g. of each of the present compounds (30) and (32) in 20 ml. of methanol was homogeneously stirred and mixed with 99 g. of a mosquito coil carrier (a 3:5:1 mixture of tabu powder, pyrethrum marc and wood flour). After vaporizing the methanol, the mixture was thoroughly kneaded with 150 ml. of water and then shaped and dried to obtain mosquito coils containing 1 % of the individual compounds.

Example 51

A mixture comprising 1 part of each of the present compounds (21) and (23) and 2 parts of Safroxane was dissolved in 20 parts of acetone. This solution was thoroughly stirred and mixed in a mortar with 97 parts of 300 mesh diatomaceous earth, and then the acetone was removed by vaporization to obtain dusts of the individual compounds.

Example 52

0.3 part of the present compound (21), 0.1 part of phthalthrin, 0.1 part of Sumithion, 7.5 parts of xylene and 6.6 parts of deodorized kerosene were mixed and dissolved together, and the thus prepared solution was filled in an aerosol container. After attaching a valve portion to the container, 85 parts of a propellant (liquefied petroleum gas) was charged therein under pressure through said valve portion to obtain an aerosol.

Insecticidal effects of the present compositions obtained in the above manner are shown below with reference to test examples.

Test Example 1

Using the Campbell's turn table apparatus ["Soap and Sanitary Chemicals", Vol. 14, No. 6, 119 [(1938)], 5 ml. of each of the oil sprays obtained in Examples 34 and 35 was sprayed. After 20 seconds from the spray, the shutter was opened, and housefly adults (about 100 flies per group) were exposed for 10 minutes to the settling mist and then transferred to an observation cage. In the cage, the flies were fed and allowed to stand for one day at room temperature. Thereafter, the number of killed flies was counted to calculate the mortality thereof. The results were as shown in Table 1.

Table 1

| Composition | | | Mortality (%) |
|---|---|---|---|
| Oil spray of Example 34, | containing | 0.2% of the compound (1) | 95 |
| do. | do. | the compound (2) | 88 |
| do. | do. | the compound (11) | 85 |
| Oil spray of Example 35, | do. | 0.2% of the compound (3) and 1% of piperonyl butoxide | 90 |
| do. | do. | 0.2% of the compound (4) and 1% of piperonyl butoxide | 92 |
| do. | do. | 0.2% of the compound (8) and 1% of piperonyl butoxide | 94 |
| Oil spray containing 0.2% of allethrin | | | 80 |

Test Example 2

Each of the emulsifiable concentrates obtained in Example 3 was diluted with water to 50,000 times. 1.5 liters of the resulting emulsion was charged into a polystyrene case of 23 cm. × 30 cm. and 6 cm. in depth, and about 50 last instar larvae of northern house mosquitoes were liberated in the emulsion. On the next day, the alive and dead of the larvae were observed to find that more than 90 % of the larvae were killed.

Text Example 3

A glass Petri dish of 14 cm. in inner diameter and 7 cm. in height was coated on the inner wall with butter, leaving at the lower part an uncoated portion of 1 cm. in width. Onto the bottom of the dish was uniformly dusted 2 g/m² of each of the dusts obtained in Example 37. Subsequently, 10 German cockroach adults were liberated in the dish and contacted with the dust for 20 minutes, whereby more than 90% of the cockroaches were knoked down in one day and more than 90 % thereof could be killed in 3 days.

Test Example 4

The insecticidal effect on housefly adults of the aerosol obtained in Example 38 was tested according to the aerosol test method using Peet Grady's chamber [the method disclosed in "Soap and Chemical Specialties, Blue Book" (1965)]. The results were as shown in Table 2.

northern house mosquito adults. 1 g. of each of the mosquito coils obtained in Example 39 was ignited on both ends and then placed at the center of the bottom of the chamber. Thereafter, the knock down effect of each mosquito coil on the mosquitoes was observed with lapse of time to find that every mosquito coil could knock down more than 80% of the mosquitoes within 20 minutes.

Test Example 6

In 1/50,000 Wagner pots were grown rice plants which had elapsed 45 days after sowing. To the rice plants, each of the dusts obtained in Example 37 was dusted in a proportion of 300 mg/pot by means of a bell jar duster, and each pot was covered with a wire net. Into the net were liberated 30 green rice leafhopper adults, whereby more than 90 % of the insects could be killed in one day.

Test Example 7

Using the same turn table apparatus as in Test Example 1, 5 ml. of each of the oil sprays obtained in Examples 40, 41 and 42 was sprayed. After 20 seconds from the spray, the shutter was opened, and housefly adults (about 100 flies per group) were exposed for 10 minutes to the settling mist and then transferred to an observation cage. In the cage, the flies were fed and allowed to stand for one day at room temperature, and then the alive and dead of the flies were observed to calculate the mortality thereof. The results were as set forth in Table 3.

Table 2

| Composition | Sprayed amount (g/1000 ft³) | Knock-down ratio (%) | | | Mortality (%) |
|---|---|---|---|---|---|
| | | 5 min. | 10 min. | 15 min. | |
| Aerosol of Example 38 | 3.0 | 18 | 57 | 90 | 83 |

Test Example 5

In a (70 cm)³ glass chamber were liberated about 50

Table 3

| Composition | | | Mortality (%) |
|---|---|---|---|
| Oil spray of Example 40, | containing | 0.2% of the compound (12) | 94 |
| do. | do. | the compound (14) | 89 |
| do. | do. | the compound (20) | 86 |
| Oil spray of Example 41, | containing | 0.2% of the compound (13) and 1% of NIA-16388 | 95 |
| do. | do. | 0.2% of the compound (15) and 1% of NIA-16388 | 93 |
| do. | do. | 0.2% of the compound (18) and 1% of NIA-16388 | 89 |

Table 3—Continued

| Composition | | | | Mortality (%) |
|---|---|---|---|---|
| Oil spray of Example 42, | containing | 0.2% of the compound and 1% of piperonyl butoxide | (16) | 90 |
| do. | do. | 0.2% of the compound and 1% of piperonyl butoxide | (17) | 92 |
| do. | do. | 0.2% of the compound and 1% of piperonyl butoxide | (19) | 87 |
| Oil spray containing 0.2% of allethrin | | | | 82 |

Test Example 8

Each of the emulsifiable concentrates obtained in Example 43 was diluted with water to 50,000 times. 1.5 Liters of the resulting emulsion was charged into a polystyrene case of 23 cm. × 30 cm. and 6 cm. in depth, and about 50 last instar larvae of northern house mosquitoes were liberated in the emulsion. On the next day, the alive and dead of the larvae were observed to find that more than 90 % of the larvae were killed.

Test Example 9

In a (70 cm)$^3$ glass chamber were liberated about 50 northern house mosquito adults. 1 g. of each of the mosquito coils obtained in Example 44 was ignited on both ends and then placed at the center of the bottom of the chamber. Thereafter, the knock down effect of each mosquito coil on the mosquitoes was observed with lapse of time to find that every mosquito coil could knock down more than 80 % of the mosquitoes within 20 minutes.

Test Example 10

A glass petri dish of 14 cm. in inner diameter and 7 cm. in height was coated on the inner wall with butter, leaving at the lower part an uncoated portion of 1 cm. in width. Onto the bottom of the dish was uniformly dusted 2 g/m$^2$ of each of the dusts obtained in Example 45. Subsequently, 10 German cockroach adults were liberated in the dish and contacted with the dust for 20 minutes, whereby more than 90 % of the cockroaches were knocked down in one day and more than 90 % thereof could be killed in 3 days.

Test Example 11

The insecticidal effect on housefly adults of the aerosol obtained in Example 46 was tested according to the same aerosol test method as in Test Example 4. The results were as shown in Table 4.

Table 4

| Composition | Sprayed amount (g/1000 ft$^3$) | Knock-down ratio (%) | | | Mortality (%) |
|---|---|---|---|---|---|
| | | 5 min. | 10 min. | 15 min. | |
| Aerosol of Example 46 | 3.2 | 14 | 55 | 89 | 76 |

Test Example 12

In 1/50,000 Wagner pots were grown rice plants which had elapsed 45 days after sowing. To the rice plants, each of the dusts obtained in Example 45 was dusted in a proportion of 300 mg/pot by means of a bell jar duster, and each pot was covered with a wire net. Into the net were liberated 30 green rice leafhopper adults, whereby more than 90% of the insects should be killed in one day.

Test Example 13

Using the same turn table apparatus as in Test Example 1, 5 ml. of each of the oil sprays obtained in Examples 47 and 48 was sprayed. After 20 seconds from the spray, the shutter was opened, and housefly adults (about 100 flies per group) were exposed for 10 minutes to the settling mist and then transferred to an observation cage. In the cage, the flies were fed and allowed to stand for one day, and then the alive and dead of the flies were observed to calculate the mortality thereof. The results were as set forth in Table 5.

Table 5

| Composition | | | | Mortality (%) |
|---|---|---|---|---|
| Oil spray of Example 47, | containing | 0.2% of | the compound (21) | 87 |
| do. | do. | | the compound (22) | 85 |
| do. | do. | | the compound (30) | 80 |
| do. | do. | | the compound (33) | 80 |
| Oil spray of Example 48, | containing | 0.2% of the compound and 1% of piperonyl butoxide | (23) | 92 |
| do. | do. | 0.2% of the compound and 1% of piperonyl butoxide | (27) | 90 |
| do. | do. | 0.2% of the compound and 1% of piperonyl butoxide | (31) | 88 |
| Oil spray containing 0.2% of allethrin | | | | 79 |

Test Example 14

Each of the emulsifiable concentrates obtained in Example 49 was diluted with water to 10,000 times. 1.5 Liters of the resulting emulsion was charged into a styrene case of 23 cm. × 30 cm. and 6 cm. in depth, and about 50 last instar larvae of northern house mosquitoes were liberated in the emulsion. On the next day, the alive and dead of the larvae were observed to find that more than 90 % of the larvae were killed.

Test Example 15

In a (70 cm)³ glass chamber were liberated about 50 northern house mosquito adults. 1 g. of each of the mosquito coils obtained in Example 50 was ignited on both ends and then placed at the center of the bottom of the chamber. Thereafter, the knock down effect of each mosquito coil on the mosquitoes was observed with lapse of time to find that every mosquito coil could knock down more than 80% of the mosquitoes within 20 minutes.

Test Example 16

In 1/50,000 Wagner pots were grown rice plants which had elapsed 45 days after sowing. To the rice plants, each of the dusts obtained in Example 51 was dusted in a proportion of 300 mg/pot by means of a bell jar duster, and each pot was covered with a wire net. Into the net were liberated 30 green rice leafhopper adults, whereby more than 90 % of the insects could be killed in one day.

Test Example 17

A glass Petri dish of 14 cm. in inner diameter and 7 cm. in height was coated on the inner wall with butter, leaving at the lower part an uncoated portion of 1 cm. in width. Onto the bottom of the dish was uniformly coated 2 g/m² of each of the dusts obtained in Example 51. Subsequently, 10 German cockroach adults were liberated in the dish and continuously contacted with the dust, whereby more than 90 % of the cockroaches were knocked down in one day and more than 90 % thereof could be killed in 3 days.

Test Example 18

The insecticidal effect on housefly adults of aerosol obtained in Example 52 was tested according to the same aerosol test method as in Test Example 4. The results were as set forth in Table 6.

Table 6

| Composition | Sprayed amount (g/1000 ft³) | Knock-down ratio (%) 5 min. | 10 min. | 15 min. | Mortality (%) |
|---|---|---|---|---|---|
| Aerosol of Example 52 | 3.1 | 18 | 54 | 91 | 82 |

What is claimed is:

1. A compound of the formula

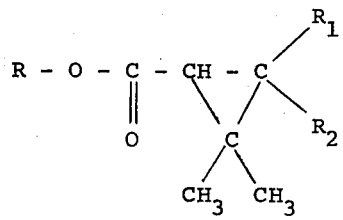

wherein $R_1$ is hydrogen or methyl, $R_2$ is methyl, 2-methyl-1-propenyl or 2-methoxycarbonyl-1-propenyl when $R_1$ is hydrogen, and $R_2$ is methyl when $R_1$ is methyl, and R is

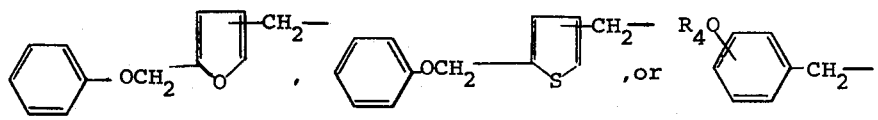

wherein $R_4$ is allyl or propargyl.

2. A compound according to claim 1, wherein R is a member selected from the group consisting of

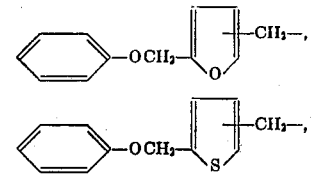

and

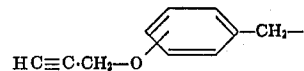

3. A compound according to claim 1, wherein $R_1$ is hydrogen and $R_2$ is 2-methyl-1-propenyl.

4. A compound according to claim 3, wherein R is a member selected from the group consisting of

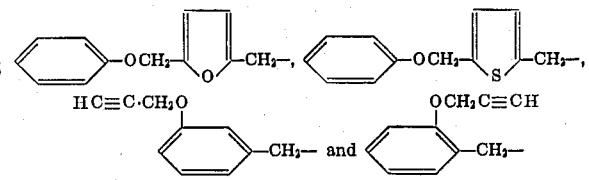

5. A compound according to claim 1, wherein $R_1$ and $R_2$ are respectively methyl.

6. A compound according to claim 5, wherein R is a member selected from the group consisting of

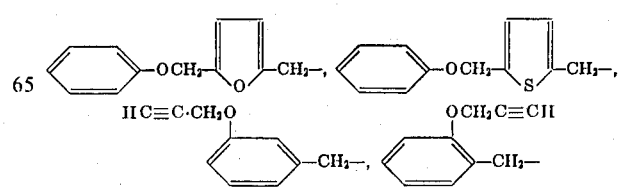

* * * * *